United States Patent [19]
Cheon

[11] Patent Number: 6,005,975
[45] Date of Patent: *Dec. 21, 1999

[54] CIRCUIT FOR COMPENSATING PATTERN RECOGNITION TYPE EDGE OF VIDEO SIGNAL PROCESSOR

[75] Inventor: Sung Ryoul Cheon, Kyungsangbook-Do, Rep. of Korea

[73] Assignee: LG Electronics Inc., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,754

[22] Filed: Apr. 22, 1996

[30] Foreign Application Priority Data

Apr. 25, 1995 [KR] Rep. of Korea .......... 95-9750

[51] Int. Cl.$^6$ ................... H04N 1/409
[52] U.S. Cl. .......... 382/199; 348/625; 382/266
[58] Field of Search ............... 382/199, 263, 382/260, 254, 266; 348/625, 628

[56] References Cited

U.S. PATENT DOCUMENTS

| | | | |
|---|---|---|---|
| 3,980,819 | 9/1976 | Schwartz | 348/625 |
| 5,194,761 | 3/1993 | Smith | 307/264 |
| 5,293,541 | 3/1994 | Ito | 348/625 |

*Primary Examiner*—Amelia Au
*Assistant Examiner*—Larry J. Prikockis
*Attorney, Agent, or Firm*—Ostrolenk, Faber, Gerb & Soffen, LLP

[57] ABSTRACT

An improved circuit for compensating a pattern recognition type edge for a video signal processor which is capable of preventing a undershooting and an overshooting by recognizing a pattern of a luminance signal which is converted into a digital form when compensating an edge of a luminance signal, by substituting a sample value at incline start or end portions and at decline start or end portions of a pattern with the previous sample value or the next sample value, by generating a plurality of luminance signals having a different delay time by sequentially delaying a luminance signal which is converted into a digital form as many as the number of samples, by subtracting a luminance signal which is delayed by the previous process from the luminance signal which is delayed by each process, by recognizing a pattern of an edge of luminance signal by logically operating a difference signal and a reference signal after computing a plurality of difference signals, and by selecting a signal among luminance signals having a different delay time in accordance with the recognized pattern.

17 Claims, 5 Drawing Sheets

FIG. 1
CONVENTIONAL ART
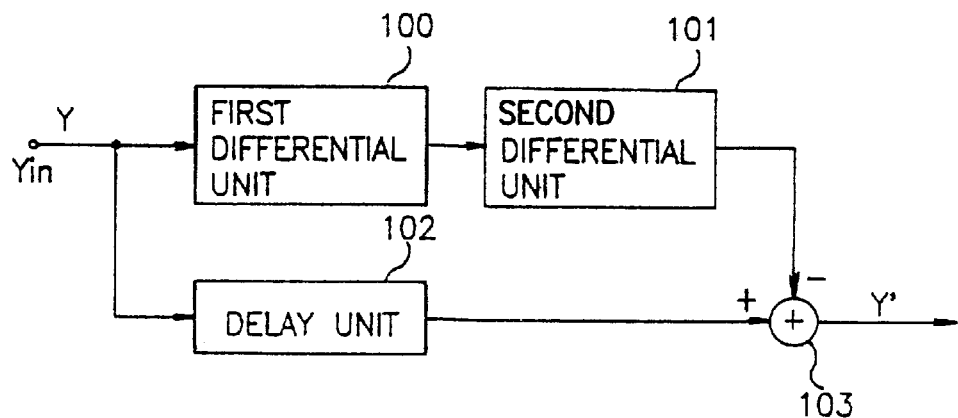
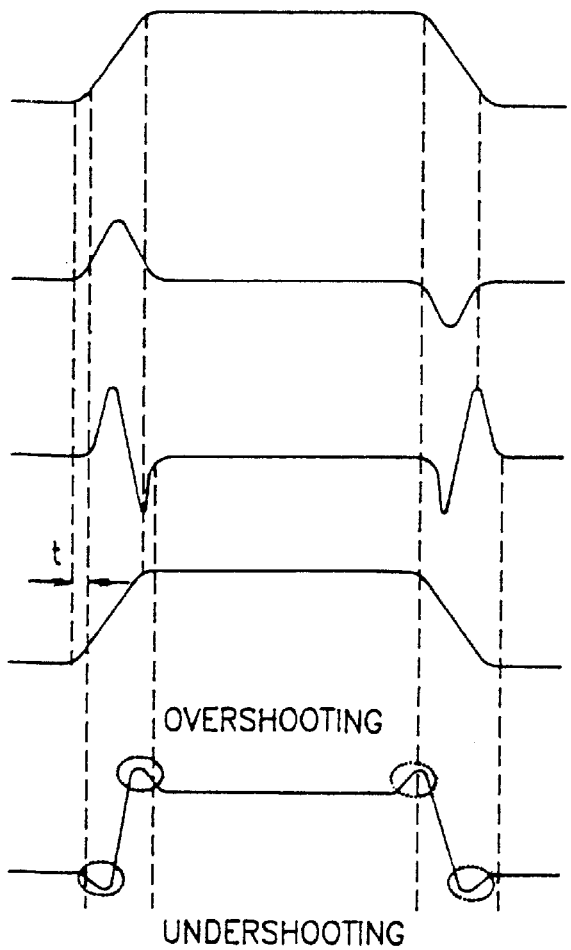
FIG. 2A CONVENTIONAL ART
FIG. 2B CONVENTIONAL ART
FIG. 2C CONVENTIONAL ART
FIG. 2D CONVENTIONAL ART
FIG. 2E CONVENTIONAL ART

CIRCUIT FOR COMPENSATING PATTERN RECOGNITION TYPE EDGE OF VIDEO SIGNAL PROCESSOR

BACKGROUND OF THE INVENTION

1. Field of the Invention

The present invention relates to a circuit for compensating an edge of a luminance signal of a video signal processor such as a television set or a video cassette tape recorder (VCR), and particularly to an improved pattern recognition type edge compensation circuit capable of more effectively compensating an edge of a luminance signal without deterioration of a picture quality by recognizing the pattern of an edge of a luminance signal which is sampled and converted from an analog signal into a digital signal and by properly selecting a sampled signal in accordance with a pattern of the recognized edge.

2. Description of the Conventional Art

FIG. 1 is a block diagram of an edge compensation circuit for a conventional video signal processor, which includes a first differential unit 100 for first-differentiating a luminance signal Y of an analog with respect to time, inputted thereto from an input terminal Yin, a second differential unit 101 for second-differentiating a signal differentiated by the first differential unit 100 with respect to time, a delay unit 102 for compensating a delay time between a luminance signal Y of an analog signal which is not applied to the first and second differential units 100 and 101 and a luminance signal Y of an analog which is applied to the first and second differential units 100 and 101, and a subtraction unit 103 for subtracting the luminance signal second-differentiated by the second differential unit 101 from the luminance signal delayed for a predetermined time by the delay unit 102.

The operation of the edge compensation circuit for a conventional video signal processor will now be explained.

To begin with, a luminance signal of an analog as shown in FIG. 2A is respectively inputted to the first differential unit 100 and the delay unit 102 through an input terminal Yin, the first differential unit 100 first-differentiates a luminance signal with respect to time and outputs a predetermined signal having a wave form as shown in FIG. 2B. Thereafter, the second differential unit 101 second-differentiates the luminance signal first-differentiated by the first differential unit 100 with respect to time and outputs a signal having a wave form as shown in FIG. 2C to the subtraction unit 103. Meanwhile, the delay unit 102 delays a luminance signal Y for a time "t" as shown in FIG. 2D so as to compensate a delay time caused by the first and second differential units 100 and 101 and outputs the delayed luminance signal to the subtraction unit 103. The subtraction unit 103 subtracts an output signal of the second differential unit 101 from the luminance signal as shown in FIG. 2D delayed for a predetermined time by the delay unit 102. Thus, a luminance signal Y' of which edge is compensated as shown in FIG. 2D is obtained.

However, the conventional edge compensation circuit has disadvantages in that under-shooting and over-shooting occur in a luminance signal Y' of which edge is compensated as shown in FIG. 2D, so that a picture quality of a luminance signal of which edge is compensated is deteriorated by the above-mentioned under-shooting and over-shooting.

SUMMARY OF THE INVENTION

Accordingly, it is an object of the present invention to provide a circuit for compensating a pattern recognition type edge, which overcome the problems encountered in a conventional circuit for compensating a pattern recognition type edge.

It is another object of the present invention to provide a circuit for compensating a pattern recognition type edge, by which a better edge compensation without a undershooting and overshooting is possible by recognizing a pattern of a luminance signal which is converted into a digital form by a video instrument such as a television set or a video cassette tape recorder and by substituting the sample value at an end portion of an incline start and at an end portion of a decline start with the previous sample value or the next sample value.

To achieve the above objects, there is provided a circuit for compensating a pattern recognition type edge, which includes an analog/digital converting unit for sampling an analog luminance signal inputted thereto and for converting the analog luminance signal into a digital luminance signal; a delay/matrix unit for generating a plurality of luminance signals having a different delay time by sequentially delaying the digital-converted luminance signal as many as the number of samples and for computing a plurality of difference signal by subtracting a luminance signal delayed in a previous process from a luminance signal which is delayed in each process; a pattern recognition unit for logically operating a difference signal obtained by the delay/matrix unit and a predetermined reference signal and for recognizing a pattern of an edge of the luminance signal; an edge compensation control unit for generating a selection control signal which is directed to controlling the selection of a luminance signal having a different delay time outputted from the delay/matrix unit in accordance with a pattern recognized by the pattern recognition unit; a switching unit for selecting a signal among luminance signals having a different delay time outputted from the delay/matrix unit in accordance with a selection control signal outputted from the edge compensation control unit; and a digital/analog converting unit for converting a luminance signal obtained by the switching unit into an analog luminance signal, so that it is possible to obtaining a better picture quality by recognizing a pattern of a luminance signal which is converted into a digital form when compensating an edge of a luminance signal, substituting a sample value at incline start or an incline end portion and at a decline start or decline end portion of a pattern, and preventing a under shooting and an overshooting.

BRIEF DESCRIPTION OF THE DRAWINGS

FIG. 1 is a block diagram of an edge compensation circuit of a conventional video signal processor;

FIGS. 2A through 2E are wave forms of a signal outputted from each element of FIG. 1;

DETAILED DESCRIPTION OF THE INVENTION

Figure 3:
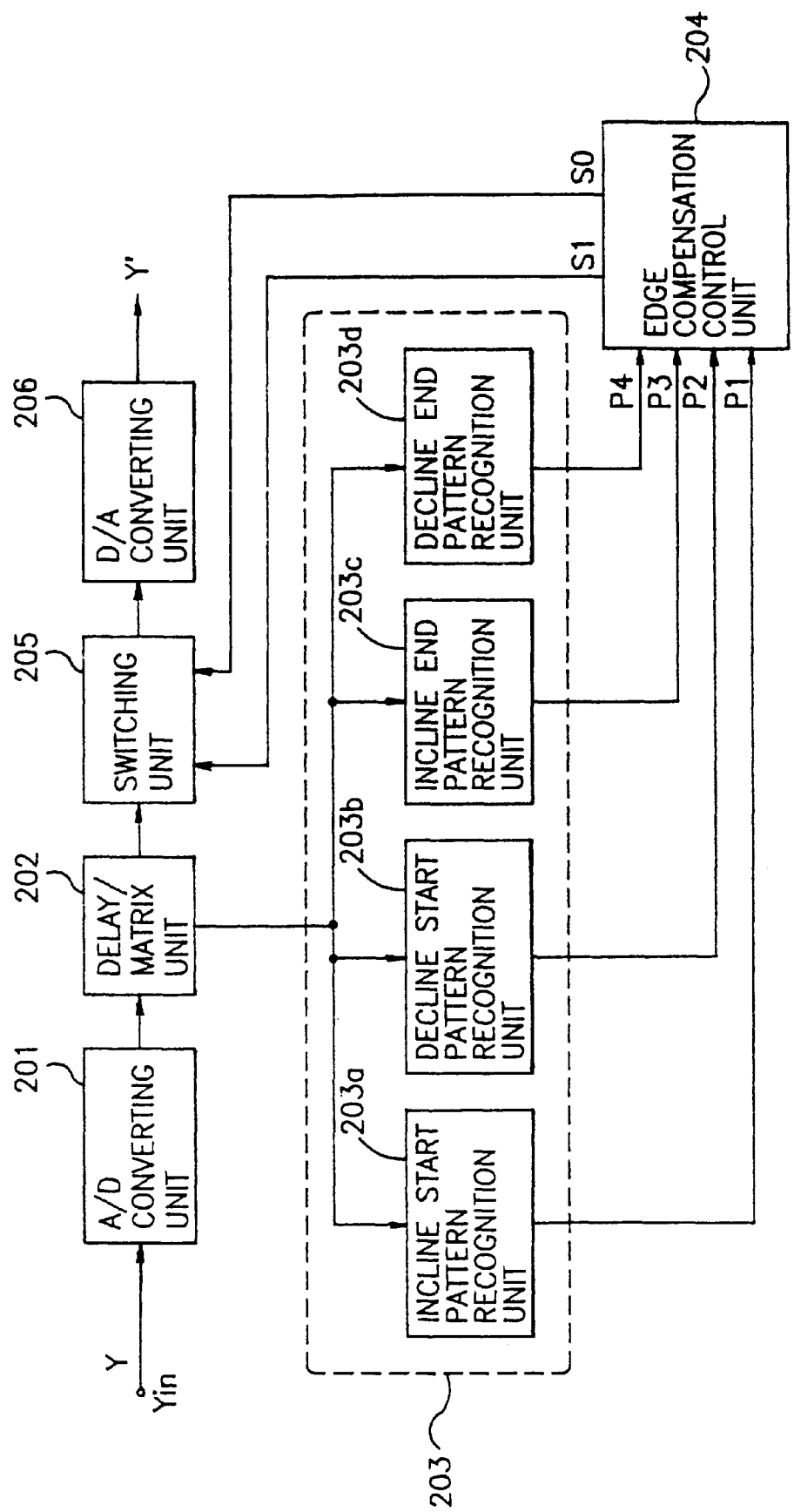
FIG. 3 is a block diagram of a circuit for compensating a pattern recognition type edge according to the present invention.

FIG. 3 shows the construction of a circuit for compensating a pattern recognition type edge according to the present invention, which includes an analog/digital converting unit 201 for sampling a luminance signal Y of an analog inputted thereto through an input terminal Yin and for converting the signal into a digital signal, a delay/matrix unit 202 for sequentially delaying a digital luminance signal outputted from the analog/digital converting unit 201 as many as the number of desired samples, outputting plural delay signals having a different delay time, and computing a difference signal between the signal delayed at each process and the signal delayed at the just previous process, a pattern recognition unit 203 for logically operating plural difference signals obtained by the delay/matrix unit 202 and predetermined reference times Vr1 and Vr2 and for recognizing a pattern of an edge of the luminance signal, an edge compensation control unit 204 for generating predetermined selection control signals S0 and S1 in accordance with pattern recognition values P1 through P4 of 4-bit outputted from the pattern recognition unit 203, a switching unit 205 for selecting a signal from luminance signals having a different delay time outputted from the delay/matrix unit 202 in accordance with selection control signals S0 and S1 generated by the edge compensation unit 204, and a digital/analog converting unit 206 for converting the digital signal selected by the switching unit 205 into an analog signal and for outputting a compensated luminance signal Y'.

Figure 4:
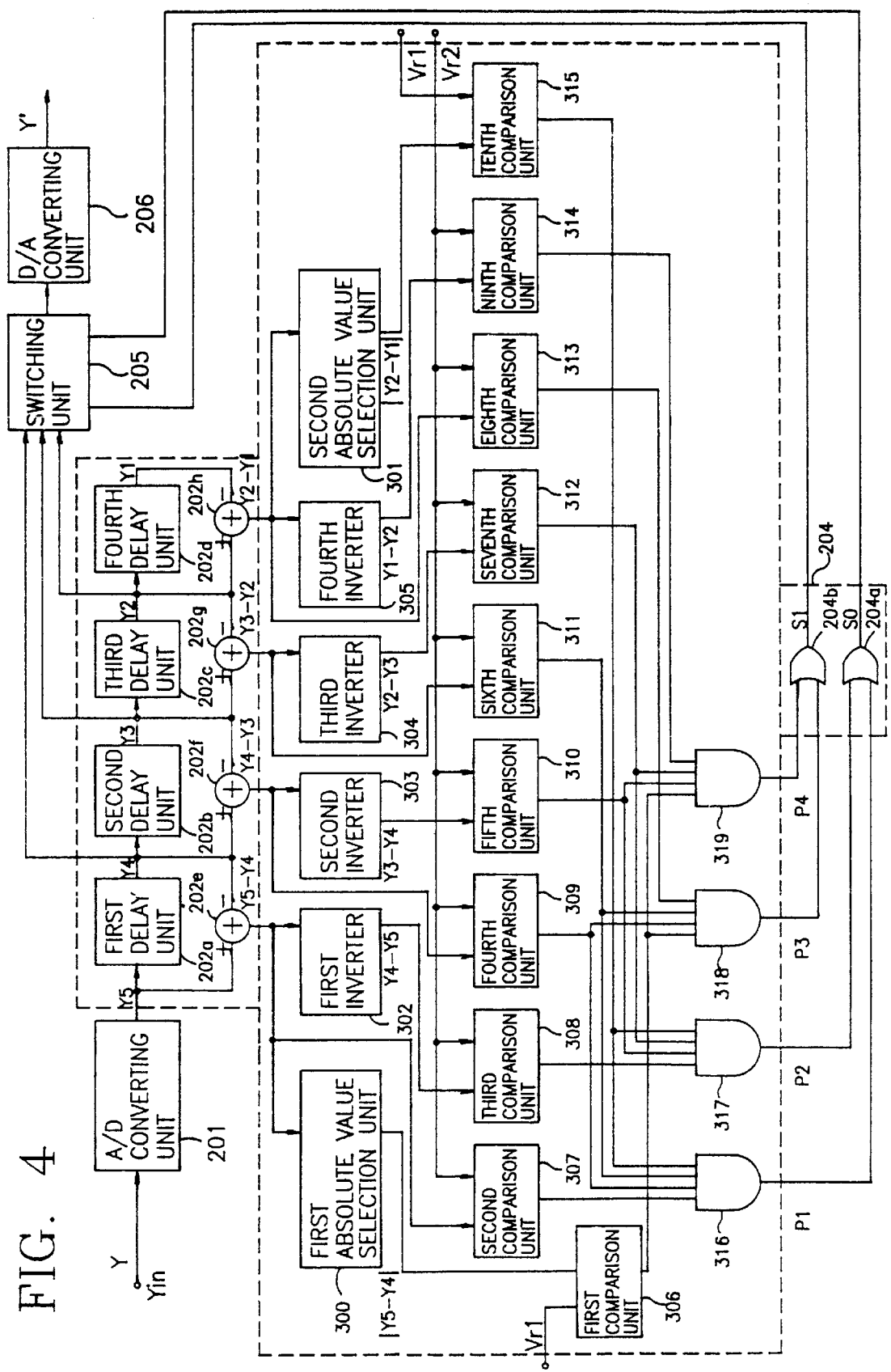
FIG. 4 is a detailed block diagram of FIG. 3 according to the present invention.

As shown in FIG. 4, the delay/matrix unit 202 includes first through fourth delay units 202a through 202d for sequentially delaying a digital luminance signal Y5 inputted thereto through the analog/digital converting unit 201 for a predetermined time and for outputting luminance signals Y4, Y3, Y2, and Y1 each having a different delay time, and first through fourth subtraction units 202e through 202h for subtracting output signals Y4 through Y1 of the first through fourth delay units 202a through 202d from input signals Y5 through Y2 of the first through fourth delay units 202a through 202d.

The pattern recognition unit 203 includes an incline start pattern recognition unit 203a and a decline start pattern recognition unit 203b for recognizing a portion (⌊-shaped) in which the luminance signal starts increasing after maintaining a constant value for a predetermined time and a portion (⌐-shaped) in which the luminance signal starts decreasing, respectively, and an incline end pattern recognition unit 203c and a decline end pattern recognition unit 203d for recognizing an incline end portion (⌈-shaped) and a decline end portion (⌊-shaped) in which the luminance signal varies and then maintains a constant value.

The incline start pattern recognition unit 203a, as shown in FIG. 4, includes a second comparison unit 307 for comparing a difference signal Y5-Y4 obtained by the first subtraction unit 202e of the delay/matrix unit 202 with a second reference value Vr2, a fourth comparison unit 309 for comparing a difference signal Y4-Y3 obtained by the second subtraction unit 202f with a second reference value Vr2, a sixth comparison unit 311 for comparing a difference signal Y3-Y2 obtained by the third subtraction unit 202g with a second reference value Vr2, a second absolute value selection unit 301 for computing an absolute value of a difference signal Y2-Y1 obtained by the fourth subtraction unit 202h, a tenth comparison unit 315 for comparing an absolute value |Y2-Y1| obtained by the second absolute value selection unit 301 with a first reference value Vr1, and a first AND-gate 316 for logically ANDing the result values of the second, fourth, sixth, and tenth comparison units 307, 309, 311, and 315.

The incline start pattern recognition unit 203b includes a first inverter 302 for inverting a difference signal Y5-Y4 obtained by the first subtraction unit 202e of the delay/matrix unit 202, a third comparison unit 308 for comparing a difference signal Y4-Y5 inverted by the first inverter 302 with a second reference value Vr2, a second inverter 303 for inverting a difference signal Y4-Y3 obtained by the second subtraction unit 202f, a fifth comparison unit 310 for comparing a difference signal Y3-Y4 inverted by the second inverter 303 with a second reference value Vr2, a third inverter 304 for inverting a difference signal Y3-Y2 obtained by the third subtraction unit 202g, a seventh comparison unit 312 for comparing a difference signal Y2-Y3 inverted by the third inverter 304 with a second reference value Vr2, a tenth comparison unit 315, and a second AND-gate 317 for logically ANDing the result values of the third, fifth, seventh, and tenth comparison units 308, 310, 312, and 315.

In addition, the incline end pattern recognition unit 203c includes a first absolute value selection unit 300 for computing an absolute value of a difference signal Y5-Y4 obtained by the first subtraction unit 202e of the delay/matrix unit 202, a first comparison unit 306 for comparing an absolute value |Y5-Y4| obtained by the first absolute value selection unit 300 with a first reference value Vr1, a fourth comparison unit 309, a sixth comparison unit 311, an eighth comparison unit 313 for comparing a difference signal Y2-Y1 obtained by the fourth subtraction unit 202h with a second reference value Vr2, and a third AND-gate 318 for logically ANDing the result values of the first, fourth, sixth, and eighth comparison units 306, 309, 311, and 313.

The decline end pattern recognition unit 203d includes a first comparison unit 306, a fifth comparison unit 310, a seventh comparison unit 312, a fourth inverter 305 for inverting a difference signal Y2-Y1 obtained by the fourth subtraction unit 202h of the delay/matrix unit 202, a ninth comparison unit 314 for comparing a difference signal Y1-Y2 inverted by the fourth inverter 305 with a second reference value Vr2, and a fourth AND-gate 319 for logically ANDing the result values of the first, fifth, seventh, and ninth comparison units 306, 310, 312, and 314.

In addition, the edge compensation control unit 204, as shown in FIG. 4, includes a first OR-gate 204a for logically ORing output signals of the first and second AND-gates 316 and 317 of the pattern recognition unit 203 and for outputting a first selection control signal S0 to the switching unit 205, and a second OR-gate 204b for logically ORing output signals P3 and P4 of the third and fourth AND-gates 318 and 319 and for outputting a second selection control signal S1 to the switching unit 205.

The operation of the circuit for compensating a pattern recognition type edge of a video signal processor will now be explained with reference to the accompanying drawings.

To begin with, when an analog luminance signal Y of which an edge is to be compensated is inputted to the analog/digital converting unit 201 through the input terminal Yin, the analog/digital converting unit 201 samples an analog luminance signal, converts the signal into a digital signal, and outputs to the delay/matrix unit 202. The delay/matrix unit 202 sequentially delays a digital luminance signal outputted from the analog/digital converting unit 201 as many as the number of desired samples, outputs plural luminance signals Y5-Y1 having a different delay time, and computes a difference signal between a signal delayed at each process and a signal just before a delay.

The operation of the delay/matrix unit 202 will now be explained in more detail with reference to FIG. 4.

The luminance signal outputted from the analog/digital converting unit 201 is sequentially delayed by the first through fourth delay units 202a through 202d. Here, when the luminance signal outputted from the analog/digital converting unit 201 is assumed as Y5, the luminance signal Y5 becomes Y4 which is delayed by the first delay unit 202a by one sample, the luminance signal Y4 becomes Y3 which is delayed by the second delay unit 202b by one sample, the luminance signal Y3 becomes Y2 which is delayed by the third delay unit 202c by one sample, and the luminance signal Y2 becomes Y1 which is delayed by the fourth delay unit 202d by one sample. The luminance signals Y4-Y1 delayed by the delay units 202a through 202d are subtracted from the previous signals Y5-Y2 by the subtraction units 202e through 202h. That is, the subtraction units 202e through 202h subtracts the luminance signal Y4 delayed by the first delay unit 202a from the previous luminance signal Y5. In the same manner, the subtraction units 202f through 202h respectively subtract Y3 from Y4, Y2 from Y3, and Y1 from Y2. Therefore, the delay/matrix unit 202 outputs the luminance signals Y4-Y2 which is delayed in a different time to the switching unit 205, and outputs the difference signals Y5-Y4, Y4-Y3, Y3-Y2, and Y2-Y1 to the pattern recognition unit 203.

The pattern recognition unit 203 recognizes the edge of a luminance signal using a difference signal outputted from the delay/matrix unit 202 and first and second reference signals Vr1 and Vr2. The pattern recognition method will now be explained in more detail hereinbelow.

The difference signal Y5-Y4 obtained by the first subtraction unit 202e is outputted to the first absolute value selection unit 300, the second comparison unit 307, and the first inverter 302. The difference signal Y4-Y3 obtained by the second subtraction unit 202e is outputted to the fourth comparison unit 309 and the second inverter 303. The difference signal Y3-Y2 obtained by the third subtraction unit 202g is outputted to the sixth comparison unit 311 and the third inverter 304. The difference signal Y2-Y1 obtained by the fourth subtraction unit 202h is outputted to the eighth comparison unit 313, the fourth inverter 305, and the second absolute value selection unit 301. The first absolute value selection unit 300 and the second absolute value selection unit 301 compute an absolute value of the signals Y5-Y4 and Y2-Y1 inputted thereto, and outputs the absolute values |Y5-Y4| and |Y2-Y1| to the first and tenth comparison units 306 and 315. In addition, the first through fourth inverters 302 through 305 invert input signals Y5-Y4, Y4-Y3, Y3-Y2, and Y2-Y1, and outputs the inverted signals Y4-Y5, Y3-Y4, Y2-Y3, and Y1-Y2 to the third, fifth, seventh, and ninth comparison units 308, 310, 312, and 314, respectively.

Therefore, the first comparison unit 306 and the tenth comparison unit 315 compare the absolute values |Y5-Y4| and |Y2-Y1| outputted from the first and second absolute value selection units 300 and 301 with a first reference Vr1, respectively, and outputs the values |Y5-Y|<Vr1 and |Y2-Y1|<Vr1. In addition, the second, fourth, sixth, and eighth comparison units compare the difference signals Y5-Y4, Y4-Y3, Y3-Y2, and Y2-Y1 obtained by the first through fourth subtraction units 202e through 202h with a second reference value Vr2, and output Y5-Y4>Vr2, Y4-Y3>Vr2, Y3-Y2>Vr2, and Y2-Y1>Vr2. In addition, the third, fifth, seventh, and ninth comparison units 308, 310, 312, and 314 compare difference signals Y4-Y5, Y3-Y4, Y2-Y3, and Y1-Y2 inverted by the first through fourth inverters 302 through 305 with a second reference value Vr2, respectively, and output Y4-Y5>Vr2, Y3-Y4>Vr2, Y2-Y3>Vr2, and Y1-Y2>Vr2.

Figure 5A:
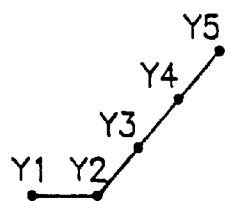
FIGS. 5A through 5D are views of an edge of various patterns according to the present invention.
Figure 5B:
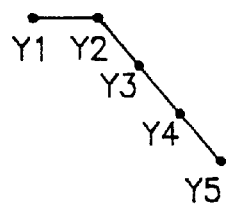
Figure 5C:
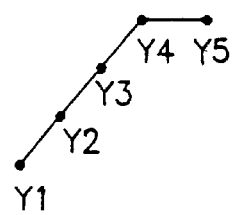
Figure 5D:
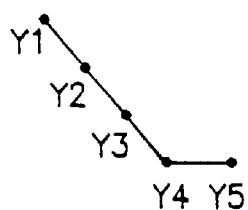

Since the first AND-gate 316 is applied with output signals of the second, fourth, sixth, and tenth comparison units 307, 309, 311, and 315, the first AND-gate 316 ANDs the above-mentioned signals and recognizes a pattern at an incline start portion as shown in FIG. 5A, and outputs a recognition value P1. Since the second AND-gate 317 is applied with output signals of the third, fifth, seventh, and tenth comparison units 308, 310, 312, and 315, the second AND-gate 317 ANDs the above-mentioned signals, recognizes a pattern at a decline start portion as shown in FIG. 5B, and outputs a recognition value P2. Since the third AND-gate 318 is applied with output signals of the first, fourth, sixth, and eighth comparison units 306, 309, 311, and 313, the third AND-gate 318 ANDs the above-mentioned signals, recognizes a pattern at an incline end portion as shown in FIG. 5C, and outputs a recognition value P3. Lastly, since the fourth AND-gate 319 is applied with output signals of the first, fifth, seventh, and ninth comparison units 306, 310, 312, and 314, the fourth AND-gate 319 ANDs the above-mentioned signals, recognizes a pattern at a decline end portion as shown in FIG. 5D, and outputs a recognition value P4.

That is, when a digital luminance signal of which an edge has a pattern as shown in FIG. 5A is inputted, the output signal P1 of the first AND-gate 316 having the following logic expression becomes a high level.

$$P1=(|Y2-Y1|<Vr1)*(Y3-Y2>Vr2)*(Y4-Y3>Vr2)*(Y5-Y4>Vr2)$$

When a digital luminance signal having an edge as shown in FIG. 5B is inputted, the output signal P2 of the second AND-gate 317 having the following expression becomes a high level.

$$P2=(|Y2-Y1|<Vr1)*(Y2-Y3>Vr2)*(Y3-Y4>Vr2)*(Y4-Y5>Vr2)$$

When a digital luminance signal having an edge as shown in FIG. 5C is inputted, the output signal P3 of the third AND-gate 318 having the following expression becomes a high level.

$$P3=(|Y5-Y4|<Vr1)*(Y2-Y1>Vr2)*(Y3-Y2>Vr2)*(Y4-Y3>Vr2)$$

In addition, when a digital luminance signal having an edge as shown in FIG. 5D is inputted, the output signal P4 of the fourth AND-gate 319 having the following expression becomes a high level.

$$P4=(|Y5-Y4|<Vr1)*(Y1-Y2>Vr2)*(Y2-Y3>Vr2)*(Y3-Y4>Vr2)$$

Therefore, a ⌊-shaped pattern of an edge of a luminance signal is recognized in accordance with the recognition value P1, a ⌉-shaped pattern is recognized in accordance with the recognition value P2, and a ⌈-shaped pattern is recognized in accordance with the recognition value P3, and a ⌊-shaped pattern is recognized by the recognition value P4.

In addition, the recognition values P1 through P4 can become a high level by varying the value of the reference signals Vr1 and Vr2, that is, the frequency of a signal for recognizing each pattern of the pattern recognition unit can be changed. Since the reference signal Vr1 becomes a reference on how much a start portion or an end portion of the pattern of the pattern recognition unit is flat, when the value of the reference signal Vr1 is great, a portion in which the variation is great can become available, so that the recognition frequency becomes high, and when the value of the reference signal Vr1 is low, since a portion in which the variation is not great is not available, the recognition frequency becomes low. Since the reference signal Vr2 becomes a reference for determining how much difference of the value at a portion, which continuously varies by the pattern recognition unit, becomes effective, when increasing the value of the reference signal Vr2, the pattern recognition unit can recognize a signal (for example, the signal having a higher frequency component) in which the value thereof continuously varies. In addition, when the value of the reference signal Vr2 becomes low, the pattern recognition unit can recognize a signal (for example, the signal having a lower frequency component) in which a lower value thereof continuously varies. Therefore, when the value of the reference signal Vr1 becomes low, the recognition frequency of the pattern recognition unit becomes high. In addition, when the value of the reference signal Vr2 becomes low, the recognition frequency of the pattern recognition unit becomes low, and when the value of the reference signal Vr2 becomes high, the recognition frequency of the pattern recognition unit becomes high.

The recognition values P1 and P2 obtained by the first and second AND-gates 316 and 317 are inputted to the first OR-gate 204a of the edge compensation control unit 204, and the recognition values P3 and P4 obtained by the third and fourth gates 318 and 319 are inputted to the second Or-gate 204b of the edge compensation control unit 204. The first and second OR-gates 204a and 204b respectively OR the recognition values P1, P2, P3, and P4 and output first and second selection control signals S0 and S1 of 4-bit.

When either the recognition value P1 or the recognition value P2 outputted from the first and second AND-gate 316 is a high level, the first OR-gate 204a outputs a first selection control signal S0 of a high level to the switching unit 205. In addition, when either the recognition value P3 or the recognition value P4 outputted from the third and fourth AND-gates 318 and 319 is a high level, the second OR-gate 204b of the edge compensation control unit 204 outputs a second selection control signal of a high level to the switching unit 205, and when the recognition values P3 and P4 are both a low level, the second OR-gate 204b outputs a second selection control signal S1 of a low level to the switching unit 205.

The switching unit 205 is applied with output signals Y4-Y2 of the first through third delay units 202a through 202c, and the signal Y3 is referred to a middle signal which is to be processed, and the signal Y2 is referred to an early signal which is to be processed, and the signal Y4 is referred to a late signal which is to be processed. When the first and second selection control signals S0 and S1 outputted from the edge compensation control unit 204 are both low, that is, when they are not referred to a pattern as shown in FIGS. 5A through 5D, the switching unit 205 directly selects the signal Y3 and outputs to the digital/analog converting unit 206. However, when the first and second selection control signals S0 and S1 of the edge compensation control unit 204 are inputted as S0=1, and S1=0, that is, as shown in FIGS. 5A and 5B, when the shape of the pattern is referred to an incline start pattern "]" and a decline start pattern "]", the switching unit 205, as shown in FIGS. 6A and 6B, selects the early signal (the output signal Y2) of the third delay unit 202c instead the middle signal which is to be processed with respect to the signal at the incline or decline start point.

Figure 6A:
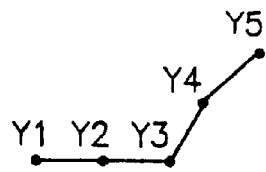
FIGS. 6A through 6D are views of an edge of various patterns of FIG. 5, which is compensated, according to the present invention.
Figure 6B:
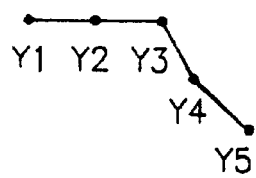
Figure 6C:
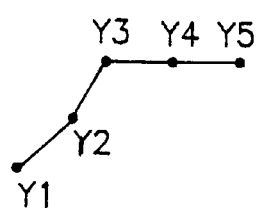
Figure 6D:
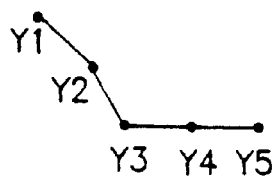

That is, as shown in FIGS. 5A and 5B, the signal Y2 (the early signal) is selected instead the signal Y3 (the middle signal) which is delayed by two samples, as shown in FIGS. 6A and 6B, and outputted to the digital/analog converting unit 206. In addition, first and second selection control signals S0 and S1 of the edge compensation control unit 204 are inputted as S0=0 and S1=1, that is, as shown in FIGS. 5C and 5D, when the patterns are like an incline end pattern "[" and a decline end pattern "[", the switching unit 205, as shown in FIGS. 6C and 6D, selects a late signal (the output signal Y4) of the first delay unit 202a instead the middle signal with respect to the signal just before the incline or decline end pattern. That is, as shown in FIGS. 5C and 5D, the signal Y4 is selected (the late signal) instead the signal Y3(the middle signal) which is delayed by two sample and outputted to the digital/analog converting unit 206.

Thereafter, the digital/analog converting unit 206 converts the luminance signal outputted from the switching unit 205 into an analog signal, so that a luminance signal Y' of which an edge is compensated is lastly outputted.

FIGS. 7A and 7B show a luminance signal of which an edge is compensated, of which FIG. 7A shows a wave form of an input luminance signal of which an edge is not compensated, and FIG. 7B shows a wave form of an output luminance signal of which an edge is compensated. In the wave form of the input luminance signal, the signal is recognized as a "]"-shape pattern at the time T1, and compensated, thus obtaining a predetermined shaped form as shown in FIG. 6A, and the signal is recognized as a "["-shaped pattern at the time T2, and compensated, thus obtaining a predetermined shaped form as shown in FIG. 6C, and the signal is recognized as a "]"-shaped pattern at the time T3, and compensated, thus obtaining a predetermined shaped form as shown in FIG. 6B, and the signal is recognized as a "["-shaped pattern at the time T4, and compensated, thus obtaining a predetermined shaped form as shown in FIG. 6D.

Meanwhile, the number of the delay units of the delay/matrix unit 202 may be changed in accordance with a sampling frequency when sampling the analog luminance signal inputted thereto through an input terminal Yin and converting into a digital luminance signal. In addition, the number of the delay units may be changed in accordance with a range of a frequency to be edge-compensated. FIG. 8 shows another embodiment of the delay/matrix unit 202 of which the number of the delay units was changed from four to eight. In this case, the first delay unit 202a of FIG. 4 is substituted with a first delay unit 202a and a fifth delay unit 202i, the second delay unit 202b is substituted with a second delay unit 202b and a sixth delay unit 202j, and the third delay unit 202c is substituted with a third delay unit 202c and a seventh delay unit 202k, and the fourth delay unit 202d is substituted with a fourth delay unit 202d and an eighth delay unit 202l. With f1 of the frequency of the signal of which an edge is compensated using output signals Y1-Y5 of the delay/matrix unit 202 having four(4) delay units as shown in FIG. 4, when compensating the edge using output signals Y'1-Y'5 of the delay/matrix unit 202 having eight delay units as shown in FIG. 8, it is possible to process signals with respect to two samples as compared to a method of processing signals with respect to one sample. As a result, when increasing the number of the delay units from four (4) up to eight (8), the sampling frequency becomes ½. Therefore, the relationship between the frequency fe of the signal of which an edge is compensated as shown in FIG. 8 and the frequency f1 of the signal processed as shown in FIG. 4 is "f2=f1/2".

As described above, the circuit for compensating an edge of a video processor according to the present invention is directed to preventing a undershooting and an overshooting by recognizing a pattern of a luminance signal which is converted into a digital form during an edge compensation of a luminance signal in a video processing apparatus such as a television set and a video cassette tape recorder and by substituting the sample values at a pattern incline start portion, an incline end portion, a decline start portion, or a decline end portion with the previous sample value or the next sample value.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A circuit for compensating a pattern recognition type edge of a video signal processor, comprising:

an analog/digital converter for sampling an analog luminance signal inputted thereto and for converting said analog luminance signal into a digital luminance signal;

delay/matrix means for generating a plurality of digital luminance signals each having a different delay time by sequentially delaying the sampled digital luminance signal outputted from said analog/digital converter by as many as the number of samples, and for computing a plurality of difference signals by subtracting a digital luminance signal delayed in a previous process from a digital luminance signal which is delayed in each process;

pattern recognition means for logically processing difference signals, obtained by said delay/matrix means and first and second reference signals, and for respectively recognizing an incline start pattern, a decline start pattern, an incline end pattern and a decline end pattern of an edge of the digital luminance signal;

edge compensation control means for generating first and second selection control signals in accordance with four patterns recognized by the pattern recognition means, wherein the edge compensation control means outputs the first selection control signal when either the incline start pattern or the decline start pattern is recognized, and ouputs the second selection control signal when either the incline end pattern or the decline end Dattern is recognized;

switching means for selectively outputting one digital luminance signal among the plurality of digital luminance signals having a different time outputted from the delay/matrix means in accordance with the first and second selection control signals outputted from said edge compensation control means, wherein the switching means outputs a middle digital luminance signal among the plurality of digital luminance signals when a logic value of the first and second selection control signals are the same, and outputs an earlier or a later digital luminance signal than the middle digital luminance signal when a logic value of the first and second selection control signals are not the same; and a digital/analog converter for converting the digital luminance signal selected by said switching means into an analog luminance signal.

2. The circuit of claim 1, wherein said delay/matrix means includes:

a plurality of delay units for delaying a sampled digital luminance signal as many as the number of samples and for outputting luminance signals having a different time; and a subtraction unit for subtracting a luminance signal inputted to each delay unit from a luminance signal outputted from each delay unit and for obtaining a difference signal between an output luminance signal and an input luminance signal of a plurality of delay units.

3. The circuit of claim 2, wherein the number of said delay units is adjusted in accordance with a sampling frequency of the analog/digital converter or a frequency range in which an edge is compensated.

4. The circuit of claim 1, wherein said pattern recognition means includes:

an incline start pattern recognition unit for recognizing an incline start pattern in which a value of a luminance signal is constantly maintained and then increased by logically operating a plurality of difference signals obtained by the delay/matrix means with a predetermined reference value and for outputting the result to the edge compensation control means; and a decline start pattern recognition unit for recognizing a decline start pattern in which a value of a luminance signal is constantly maintained and then decreased by logically operating a plurality of difference signals obtained by the delay/matrix means and a predetermined reference value and for outputting the result to the edge compensation control means.

5. The circuit of claim 1, wherein said pattern recognition means includes:

an incline end pattern recognition unit for recognizing an incline end pattern in which a value of a luminance signal is increased and then constantly maintained by logically operating a plurality of difference signals obtained by the delay/matrix means and a predetermined reference value and for outputting the result to an edge compensation control means; and a decline end pattern recognition unit for recognizing a decline end pattern in which a value of a luminance signal is decreased and then is constantly maintained by logically operating a plurality of difference signals obtained by the delay/matrix means and a predetermined reference value and for outputting the result to the edge compensation control means.

6. The circuit of claim 1, wherein said pattern recognition means is directed to varying a frequency of a luminance signal in which an edge can be compensated by varying values of the first and second reference signals.

7. A circuit for compensating a pattern recognition type edge of a video signal processor, comprising:

analog/digital converting means for sampling an analog luminance signal inputted thereto and for converting said analog luminance signal into a digital luminance signal;

delay/matrix means for generating a first, second, third and fourth digital luminance signals having a different delay time by sequentially delaying the sampled digital luminance signal outputted from said analog/digital converting means by as many as the number of samples, and for computing first, second, third, and fourth difference signals by subtracting a digital luminance signal delayed in a previous process from a digital luminance signal which is delayed in each process;

pattern recognition means for logically processing the first, second, third and fourth difference signals and first and second reference signals, and for respectively recognizing an incline start pattern, a decline start pattern, an incline end pattern and a decline end pattern of an edge of the digital luminance signal;

edge compensation control means for generating first and second selection control signals in accordance with a pattern recognized by the pattern recognition means, wherein the edge compensation control means outputs the first selection control signal when either the incline start pattern or the decline start pattern is recognized, and outputs the second selection control signal when either the incline end pattern or the decline end pattern is recognized;

switching means for selectively outputting one digital luminance signal among the first, second, third and fourth digital luminance signals outputted from the delay/matrix means in accordance with the first and second selection control signals outputted from said edge compensation control means, wherein the switching means outputs the second digital luminance signal when a logic value of the first and second selection control signals are the same, and outputs the third delayed digital luminance signal or the first digital luminance signal which is a late signal when a logic value of the first and second selection control signals are not the same; and digital/analog converting means for converting the digital luminance signal selected by said switching means into an analog luminance signal.

8. The circuit of claim 7, wherein the delay/matrix means includes:

first, second, third, and fourth delay units for sequentially delaying a sampled digital luminance signal as many as the number of samples and for outputting the first, second, third and fourth digital luminance signals having a different time;

a first subtraction unit for subtracting the sampled digital luminance signal from the first digital luminance signal and outputting a first difference signal;

a second subtraction unit for subtracting the first digital luminance signal from the second digital luminance signal and outputting a second difference signal;

a third subtraction unit for subtracting the second digital luminance signal from the third digital luminance signal and outputting a third difference signal; and a fourth subtraction unit for subtracting the third digital luminance signal from the fourth delayed luminance signal and outputting a fourth difference signal.

9. The circuit of claim 8, wherein the number of said delay units is adjusted in accordance with a sampling frequency of the analog/digital converting means or a frequency range in which an edge is compensated.

10. The circuit of claim 7, wherein the switching means outputs the third digital luminance signal outputted from the delay/matrix means when only the first selection control signal is high level, and outputs the first digital luminance signal outputted from the delay/matrix means when only the second selection control signal is at a high level.

11. The circuit of claim 7, wherein the pattern recognition means includes:

a first absolute value selection unit for computing an absolute value of the first difference signal;

a first inverter for inverting the first difference signal;

a second inverter for inverting the second difference signal;

a third inverter for inverting the third difference signal;

a fourth inverter for inverting the fourth difference signal;

a second absolute value selection unit for computing an absolute value of the fourth difference signal;

a first comparison unit for comparing an output of the first absolute value selection unit with the first reference signal;

a second comparison unit for comparing the first difference signal with the second reference signal;

a third comparison unit for comparing an output of the first inverter with the second reference signal;

a fourth comparison unit for comparing the second difference signal with the second reference signal;

a fifth comparison unit for comparing an output of the second inverter with the second reference signal;

a sixth comparison unit for comparing the third difference signal with the second reference signal;

a seventh comparison unit for comparing an output of the third inverter with the second reference signal;

an eighth comparison unit for comparing the fourth difference signal with the second reference signal;

a ninth comparison unit for comparing an output of the fourth inverter with the second reference signal;

a tenth comparison unit for comparing an output of the second absolute value selection unit with the first reference signal;

a first AND-gate for ANDing outputs of the second, fourth, sixth and tenth comparison units;

a second AND-gate for ANDing outputs of the third, fifth, seventh and tenth comparison units;

a third AND-gate for ANDing outputs of the first, fourth, sixth and eighth comparison units; and a fourth AND-gate and for ANDing outputs of the first, fifth, seventh and ninth comparison units.

12. The circuit of claim 11, wherein the pattern means includes:

an incline start pattern recognition unit for recognizing an incline start pattern of the sampled digital luminance signal, wherein the incline start pattern recognition unit includes the second absolute value selection unit, the second, fourth, sixth and tenth comparison units and the first AND-gate;

a decline start pattern recognition unit for recognizing a decline start pattern of the sampled digital luminance signal, wherein the decline start pattern recognition unit includes the second absolute value selection unit, the third, fifth, seventh and tenth comparison units and the second AND-gate;

an incline end pattern recognition unit for recognizing an incline end pattern of the sampled digital luminance signal, wherein the incline end pattern recognition unit includes the first absolute value selection unit, the first, fourth, sixth and eighth comparison units and the third AND-gate; and a decline end pattern recognition unit for recognizing a decline end pattern of the sampled digital luminance signal, wherein the decline end pattern recognition unit includes the first absolute value selection unit, the first, fifth, seventh and ninth comparison units and the fourth AND-gate.

13. The circuit of claim 12, wherein the incline start pattern recognition unit is performed in accordance with the following expression:

$$P1=(|Y2-Y1|<Vr1)*(Y3-Y2>Vr2)*(Y4-Y3>Vr2)*(Y5-Y4>Vr2)$$

where Y1 through Y5 denote sample values which are sampled by the analog/digital converting means and delayed by the delay/matrix means, and Vr1 and Vr2 denote the first and second reference signals respectively.

14. The circuit of claim 12, wherein the decline start pattern recognition unit is performed in accordance with the following expression:

$$P2=(|Y2-Y1|<Vr1)*(Y2-Y3>Vr2)*(Y3-Y4>Vr2)*(Y4-Y5>Vr2)$$

where Y1 through Y5 denote sample values which are sampled by the analog/digital converting means and delayed by the delay/matrix means, and Vr1 and Vr2 denote the first and second reference signals respectively.

15. The circuit of claim 12, wherein the incline end pattern recognition unit is performed in accordance with the following expression:

$$P3=(|Y5-Y4|<Vr1)*(Y2-Y1>Vr2)*(Y3-Y2>Vr2)*(Y4-Y3>Vr2)$$

where Y1 through Y5 denote sample values which are sampled by the analog/digital converting means and delayed by the delay/matrix means, and Vr1 and Vr2 denote the first and second reference signals respectively.

16. The circuit of claim 12, wherein the decline end pattern recognition unit is performed in accordance with the following expression:

$$P4=(|Y5-Y4|<Vr1)*(Y1-Y2>Vr2)*(Y2-Y3>Vr2)*(Y3-Y4>Vr2)$$

where Y1 through Y5 denote sample values which are sampled by the analog/digital converting means and delayed by the delay/matrix means, and Vr1 and Vr2 denote the first and second reference signals respectively.

17. The circuit of claim 7, wherein the edge compensation control means includes:

a first OR-gate for ORing the recognized results of the incline start pattern and the decline start pattern outputted from the pattern recognition means and for outputting the first selection control signal; and a second OR-gate for ORing the recognized results of the incline end pattern and the decline end pattern outputted from the pattern recognition means and for outputting the second selection control signal.

\* \* \* \* \*